Aug. 28, 1923.
W. M. McEWEN
1,466,179
TIRE TOOL
Filed Aug. 19, 1921
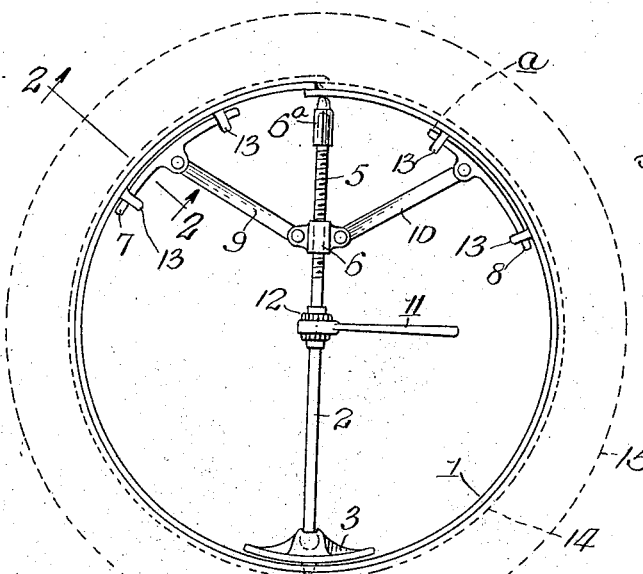
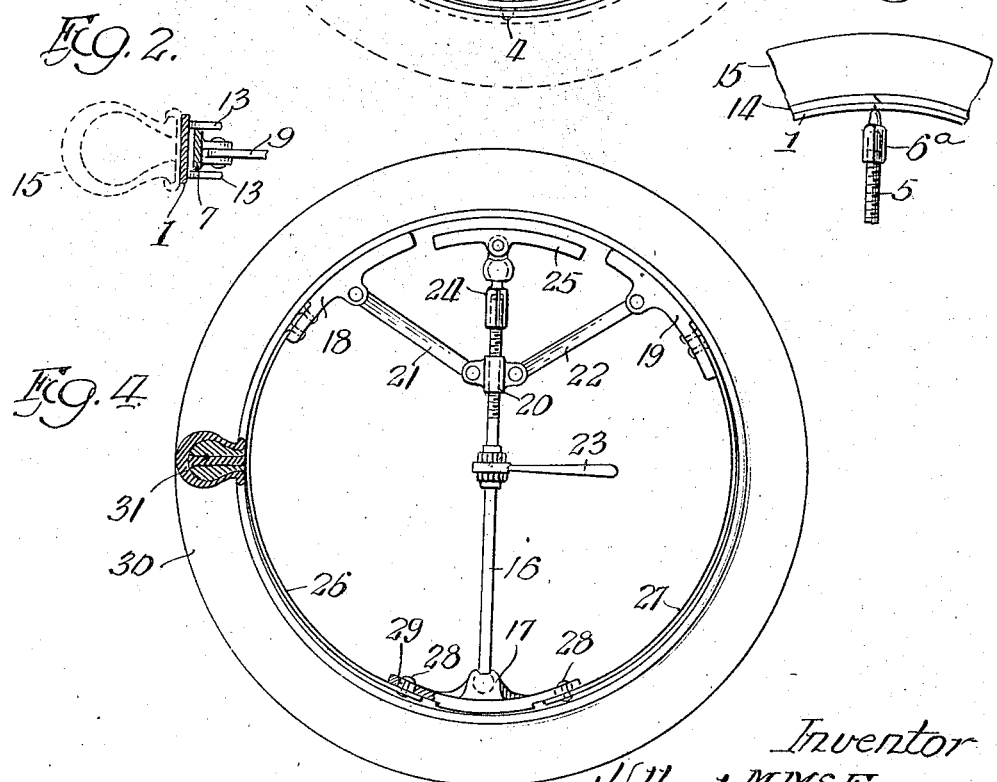
Inventor
Willard M. McEwen Patented Aug. 28, 1923.

1,466,179

UNITED STATES PATENT OFFICE.

WILLARD M. McEWEN, OF CHICAGO, ILLINOIS.

TIRE TOOL.

Application filed August 19, 1921. Serial No. 493,556.

*To all whom it may concern:*

Be it known that I, WILLARD M. MCEWEN, a citizen of the United States, residing at Chicago, in the county of Cook and State of Illinois, have invented new and useful Improvements in Tire Tools, of which the following is a specification.

This invention relates to tire tools of the expansible and contractable kind, and consists in the matters hereinafter described and more particularly set forth in the appended claims.

In the accompanying drawings—

Fig. 1 is a side view of a tire tool constructed in accordance with my invention and adapted for expanding collapsible or split rims;

Fig. 2 is a transverse sectional view taken on line 2—2 of Fig. 1;

Fig. 3 is a fragmentary view showing a detail of construction in the form of tool shown in Fig. 1; and Fig. 4 is a like view of a tool also embodying the features of my invention and adapted for expanding a tire casing with contained rubber filler.

For expanding a split or collapsible rim, the tool is constructed as shown in Fig. 1. As there illustrated, the tool comprises a split annular band or member 1, in which is located a bolt 2, this extending diametrically across the band, as shown. Said bolt 2 has a universal or equivalent connection at one end with a shoe 3 bearing against the inside of the band and anchored thereto by a pin or stud 4. The opposite end of the bolt 2 terminates short of the split or severed ends of the band 1 and is provided above its center with a screw-threaded portion 5, on which is a traveling nut 6. On opposite sides of the bolt 2 are arcuate shaped members or shoes 7 and 8, both connected with the nut 6 by links 9 and 10. These have pivotal connection at their ends with the nut 6 and shoes 7, 8, respectively, and hold the shoes in contact with the inner surface of the band 1. To facilitate turning the bolt 2, I may provide a handle 11 carried by the bolt and having a ratchet or equivalent connection with an enlarged mid-portion 12 thereof, as shown in Fig. 1. The band is provided with a number of inwardly projecting lugs 13, 13 arranged on opposite sides of the shoes 7 and 8 to guide the same and prevent them from being displaced laterally off the sides of the band. The band forms a carrier for the shoes and the other parts of the tool and also holds such parts from displacement out of the plane of each other and thus keeps the parts from being distorted or twisted out of proper positions.

The tool described and shown in Fig. 1 is used in the following manner. The nut 6 is drawn inward on the bolt 2 to allow the band to collapse or be contracted so that its split or severed ends are out of endwise alignment and overlap. The band 1 then has an outside diameter less than the inside diameter of a split or collapsible tire rim 14 when the latter is collapsed, as shown in Fig. 1. This enables the tool to be inserted or placed inside of the collapsed rim 14 with the latter extending circumferentially about the same, and a tire casing 15 with contained inflatable inner tube about the outside of the rim and in position to engage properly the clincher channels of the rim when the latter is expanded.

To expand the rim 14 into tight contact with the tire casing 15 and enable the split ends of the rim to be locked together for holding the rim expanded and tire fixed thereon, the bolt 2 is turned in a direction to cause the nut 6 to travel outward toward the outer end of the bolt.

In the initial movement of the nut 6 an outward pressure is applied against the shoe 7 through the link 9, in a direction to force the shoe into tight contact with the band 1 and to cause the latter to be forced into tight contact with the adjacent portion of the rim 14. Also the bolt 2 forces the shoe 3 into tight contact with the band 1, with the result that that half of the band against which the shoe 7 bears is forced in tight contact with the adjacent section of the rim 14. This movement does not expand the band 1 or the rim 14. As the outward travel of the nut 6 continues, the links 9 and 10 tend to straighten out or be brought toward endwise alignment, and serve to force the shoe 8 through the link 10 into tight contact with the section of the band against which it bears and move that section and the adjacent section of the rim 14 outward to expand the same. The link 10 is pivoted to the shoe 8 off-center toward the outer end *a* of the shoe. This causes that end to first contact tightly with the band 1 and increase the area of contact along the length of the shoe as outward pressure against the same is increased, with the result that the section of the band 1 against which the shoe 8 is forced is expanded outward from the opposite section of the band and a like motion imparted to the rim 14. This is continued until the severed ends of the band 1 and of the rim 14 are brought out of overlapping engagement, whereupon the spring qualities of the parts cause said ends to snap past each other into endwise alignment. At such time the rim 14 is expanded in tight contact with the tire casing 15 to the fullest extent permitted by the casing, and the rim parts are then locked together by the usual means provided to hold the rim 14 expanded and the tire casing 15 thereon. Should it be necessary to move one of the split ends of the band 1 outward so as to bring it into proper endwise contact with the other split end after the rim has been expanded as far as permitted by the tire, I provide on the adjacent outer end of the bolt 2 a sleeve nut 6ª, which may be adjusted into contact with the band 1 and serve to align the split ends of the parts, as shown in Fig. 3.

In Fig. 4, I have shown a tool also embodying the features of my invention, but adapted for expanding tire casings when resilient fillers are used therein in place of inflatable pneumatic tubes. When using fillers of the kind made annular and of three vulcanized, circumferentially extending strips of resilient rubber with one strip arranged vertically and centrally between the other two, considerably more power is required for expanding a tire casing containing such a filler than when expanding a split rim into contact with a pneumatic tire, because the center strip is harder than the other two to support the normal load on the tire, and together with the two other rubber strips offers a great deal more resistance to expansion than that offered by a pneumatic tire. Furthermore, the tool must be made to not only expand such a tire, but to carry the same expanded to a greater diameter than the rim into which it is forced from off the tool. This kind of filler is shown in my copending application Serial No. 497,731, filed June 23, 1921.

The tool for this duty is shown in Fig. 4 herein and, as illustrated, comprises a bolt 16 and three arcuate shoes 17, 18 and 19. The shoe 17 is at one end of the bolt 16 and has swiveled connection therewith, while the other shoes 18 and 19 are on opposite sides of the bolt, like in the form of tool shown in Fig. 1. The bolt 16 has a screw-threaded portion and on this is a traveling nut 20 connected with the shoes 18, 19 on opposite sides thereof by links 21, 22. These are pivoted at their ends with the shoes and nut, respectively, the same as in Fig. 1. On the bolt 16 is a handle 23 having ratchet connection therewith for turning the bolt. On the threaded end of the bolt 16 is a sleeve nut 24 carrying an arcuate shoe 25. This is between the shoes 18 and 19 and has a universal connection with said sleeve nut 24, as shown in Fig. 4. The shoes 18, 19 are connected with the shoe 17 by arcuate strips or bands 26, 27 on opposite sides of the bolt and completing the annular contour of the tool between such parts. These bands 26, 27 are secured to the shoes 18, 19 and have sliding connection with the shoe 17 by rivets 28 and slots 29 in the respective parts.

The tool of Fig. 4 is used as follows. When collapsed or contracted, it is placed inside of a tire casing or shoe 30 containing a resilient annular rubber filler 31 of the kind heretofore mentioned. After being placed, the bolt 16 is turned to expand the tool and force the shoes 17, 18 and 19 in tight contact with the inside of the tire casing and expand the same and filler to a diameter greater than the rim on the wheel provided to receive the same. After being expanded to the extent required, the sleeve nut 24 is turned to force the shoe 25 into tight contact with the portion of the tire between the shoes 18, 19 and expand that portion sufficiently to make the tire annular in form throughout, this being of course aided by the bands 26, 27 and the other shoes. When expanded the tool is placed against the side of a clincher or other rim on a wheel and the expanded tire casing and filler pried or moved off the tool into said rim, in the general manner shown in my said copending application. The bands 26, 27, also serve to hold the shoes 17, 18, and 19 in the same plane with each other and with the bolt 16, as does the band 1 of the tool in Fig. 1.

With the tools described, expanding a split or collapsible rim or a tire casing with contained resilient filler is facilitated and made much easier than with the kind of tools heretofore employed. The distribution of pressure against the inside of the rim or tire casing, as the case may be, is exactly where required to effect an efficient action and that with ease and dispatch. Furthermore, the parts are so arranged and constructed that the leverage exerted by the tool in expanding the parts is all that is needed with the expenditure of minimum effort by the operator. The operative or working parts of the tool are kept in their proper positions and places and thus can not drop one against the other or move out of place when the tool is not in use and stood in the corner or placed on the floor or bench. This makes the tool efficient because it is not necessary, when use for the tool is needed, to spend time and trouble in adjusting the parts into proper positions within the split rim or within the tire casing, as the case may be. Thus all that need be done to use the tool is to insert the same when collapsed in working position and turn the bolt to expand the tool in the manner described. Other advantages will be apparent to those skilled in the art to which my invention relates. While I have shown and described herein in detail tire tools constructed in accordance with my invention, it is to be of course understood that the details of construction and arrangement of parts illustrated may be variously changed and modified without departing from the spirit and scope of my invention.

I claim as my invention:

1. A tire tool, comprising a split annular band, two shoes inside of said band and slidably engaging the same on opposite sides of the split ends of said band and adjacent the same, and means inside of said band and engaged with said shoes and with said band at a point diametrically opposite the split ends thereof for expanding said band by applying an outward pressure against said shoes.

2. A tire tool, comprising three shoes, a bolt engaging one of the shoes and arranged between the other two, a traveling nut on said bolt, links extending between and pivoted to said nut and the shoes on opposite sides of said bolt, and arcuate bands extending between and connecting the third shoe with the two shoes, each band being secured to one of the shoes between which it extends and having sliding connection with the other shoe.

3. A tire tool, comprising three shoes, a bolt engaging one of the shoes and arranged between the other two, a traveling nut on said bolt, links extending between and pivoted to said nut and the shoes on opposite sides of said bolt, a sleeve nut on the free end of said bolt, and arcuate members carried by said shoes and sleeve nut, respectively.

In testimony that I claim the foregoing as my invention, I affix my signature this 12th day of August, A. D. 1921.

WILLARD M. McEWEN.